US011132644B2

(12) United States Patent
Innes et al.

(10) Patent No.: US 11,132,644 B2
(45) Date of Patent: Sep. 28, 2021

(54) METHOD AND APPARATUS FOR MANAGING EMPLOYMENT-RELATED DECISIONS

(71) Applicant: AT&T INTELLECTUAL PROPERTY I, LP, Atlanta, GA (US)

(72) Inventors: Timothy Innes, Atlanta, GA (US); Nigel Bradley, McDonough, GA (US); Alexander MacDougall, Newnan, GA (US); Bhumit Patel, Atlanta, GA (US); Wasib Khallil, Atlanta, GA (US); David Spivey, Smyrna, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1341 days.

(21) Appl. No.: 15/196,471

(22) Filed: Jun. 29, 2016

(65) Prior Publication Data
US 2018/0005190 A1 Jan. 4, 2018

(51) Int. Cl.
*G06Q 10/06* (2012.01)
*G06Q 10/10* (2012.01)

(52) U.S. Cl.
CPC ..... *G06Q 10/1053* (2013.01); *G06Q 10/0639* (2013.01); *G06Q 10/063112* (2013.01)

(58) Field of Classification Search
CPC ....... G06Q 10/1053; G06Q 10/063112; G06Q 10/0639

(Continued)

(56) References Cited

U.S. PATENT DOCUMENTS 6,735,570 B1 * 5/2004 Lacy .............. G06Q 10/063112
705/7.14
6,917,952 B1 7/2005 Dailey et al.
(Continued)

FOREIGN PATENT DOCUMENTS

CA 2544324 A1 12/2006
WO WO-0213095 A2 * 2/2002 ............... G09B 5/00
(Continued)

OTHER PUBLICATIONS

Velasco; More than just good grades: candidates' perceptions about the skills and attributes employers seek in new graduates; May 28, 2012; https://journals.vgtu.lt/index.php/JBEM/article/download/4401/3737/; p. 1-19.*

(Continued)

*Primary Examiner* — Jerry O'Connor
*Assistant Examiner* — James Webb
(74) *Attorney, Agent, or Firm* — Guntin & Gust, PLC; Andrew Gust

(57) ABSTRACT

Aspects of the subject disclosure may include, for example, selecting a subset of employees from among a group of employees according to performance data of the group of employees where the group of employees is associated with an employment position and where a group of known desired attributes is associated with the employment position, analyzing employee information for the subset of employees to identify a correlation, identifying an unknown desired attribute according to the correlation, obtaining candidate information for a group of candidates, selecting a subset of candidates from among the group of candidates according to a comparison of the group of known desired attributes, the unknown desired attribute and the candidate information. Other embodiments are disclosed.

20 Claims, 5 Drawing Sheets

(58) Field of Classification Search
USPC .......................................................... 705/7.14
See application file for complete search history.

(56) References Cited

U.S. PATENT DOCUMENTS

| | | | |
|---|---|---|---|
| 7,383,241 B2 | 6/2008 | Velipasaoglu et al. | |
| 7,437,309 B2 | 10/2008 | Magrino et al. | |
| 7,472,097 B1 | 12/2008 | Scarborough et al. | |
| 7,555,441 B2 | 6/2009 | Crow et al. | |
| 7,562,059 B2 | 7/2009 | Scarborough et al. | |
| 8,086,558 B2 | 12/2011 | Dewar et al. | |
| 8,117,024 B2 | 2/2012 | Dane et al. | |
| 8,463,810 B1 | 6/2013 | Rennison et al. | |
| 8,818,910 B1 | 8/2014 | Jiang et al. | |
| 9,117,180 B1 | 8/2015 | Chiu et al. | |
| 9,280,745 B1 | 3/2016 | Clark et al. | |
| 2005/0246299 A1* | 11/2005 | Scarborough | G06Q 10/10 706/21 |
| 2009/0164311 A1 | 6/2009 | Deyo et al. | |
| 2011/0055098 A1 | 3/2011 | Stewart et al. | |
| 2011/0307303 A1 | 12/2011 | Dutta et al. | |
| 2013/0260357 A1 | 10/2013 | Reinerman-Jones et al. | |
| 2013/0290207 A1* | 10/2013 | Bonmassar | G06Q 10/06311 705/321 |
| 2014/0122188 A1* | 5/2014 | Van Pelt | G06Q 10/063112 705/7.42 |
| 2014/0122355 A1 | 5/2014 | Hardtke et al. | |
| 2014/0317079 A1 | 10/2014 | Obernikhin et al. | |
| 2015/0006422 A1 | 1/2015 | Carter et al. | |
| 2015/0161567 A1 | 6/2015 | Mondal et al. | |
| 2015/0347954 A1 | 12/2015 | Stern et al. | |

FOREIGN PATENT DOCUMENTS

| | | |
|---|---|---|
| WO | 2014052798 A3 | 5/2014 |
| WO | 2015136555 | 9/2015 |
| WO | 2015200880 | 12/2015 |

OTHER PUBLICATIONS

"A Big Data Platform for Modern Recruitment", Search, searchtechnologies.com, Aug. 2, 2015.

"Innovative AI Engine which learns from your hiring patterns", predikt, predikt.co, Feb. 4, 2016.

"Intelligent Hiring with Resume Parser and Ranking using Natural Language Processing and Machine Learning", International Journal of Innovative Research in Computer and Communication Engineering, vol. 4, Issue 4, Apr. 2016.

Laban, John, "Approaching the Hiring of Engineers as a Machine Learning Problem", Pager Duty, pagerduty.com, Oct. 16, 2012.

Srivastava, Rajiv et al., "RINX: Information Extraction, Search and Insights from Resumes", https://www.researchgate.net/profile/Girish_Palshikar/publication/280944384_RINX_Information_Extraction_Search_and_Insights_from_Resumes/links/55cdd8ae08ae502646a4c3f1.pdf, 2008.

* cited by examiner

100

300

METHOD AND APPARATUS FOR MANAGING EMPLOYMENT-RELATED DECISIONS

FIELD OF THE DISCLOSURE

The subject disclosure relates to a method and apparatus for managing employment-related decisions.

BACKGROUND

Employment-related processes (e.g., hiring or promoting) can be expensive. In addition to the analysis and determination process, other costs can occur such as training/onboarding process, or the cost of replacing that new-hire if, for whatever reason, it is determined that he or she is not a good fit for the company.

Employee acquisition and retention are considered to be a significant cornerstone of any successful business. Traditionally, the candidate interview and vetting process takes a significant number of man-hours. Such a process has drawbacks. First, it adds the expense described above. Second, the time taken to screen a candidate that is ultimately unsuited for an employer's current needs means that a preferred or ideal candidate might be missed. For example, this ideal candidate could be offered another position before the employer is able to interview them or the employer may fill its needs with sub-optimal hires and stop looking before the employer processes the ideal or preferred candidate's resume.

BRIEF DESCRIPTION OF THE DRAWINGS

Reference will now be made to the accompanying drawings, which are not necessarily drawn to scale, and wherein.

DETAILED DESCRIPTION

Figure 1:
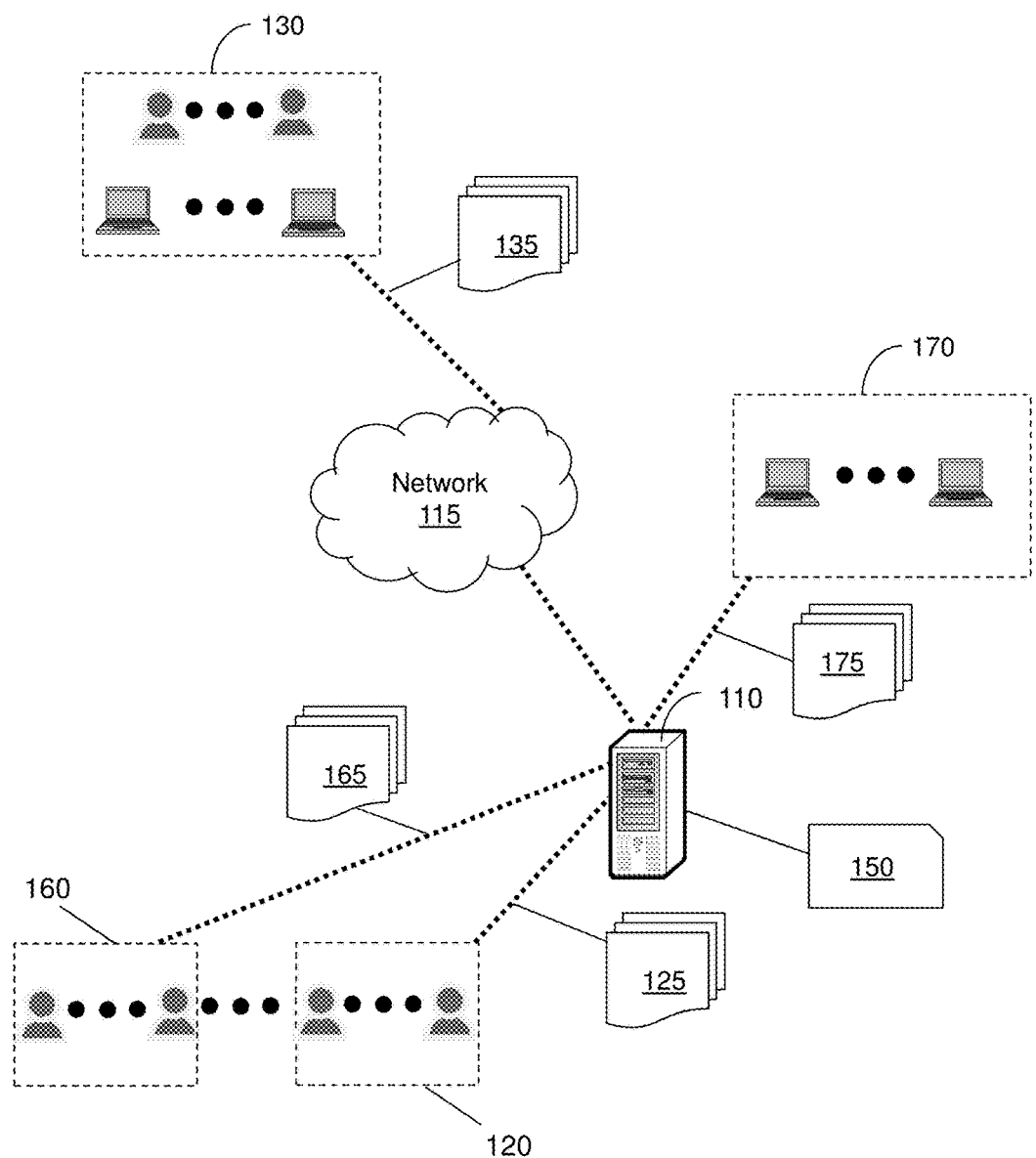
FIG. 1 depicts an illustrative embodiment of a system that facilitates employment-related decisions.

The subject disclosure describes, among other things, illustrative embodiments for intelligently hiring and/or promoting persons based on data analysis of current employees, former employees and/or other candidates. In one or more embodiments, reference information associated with current employees, former employees and/or other individuals (e.g., past rejected candidates or past candidates that did not accept an offer) can be obtained including resumes, performance evaluations and other metrics (e.g., non-employment related data such as publically available information indicating participation in non-employment events). The reference information can be analyzed to identify target characteristics that are desired in a candidate and/or non-target characteristics that are not desired in a candidate. In one embodiment, information associated with potential employees or with current employees eligible for a promotion can be obtained and compared to the target information and/or the non-target information. A determination can then be made to identify best candidates according to the comparison. In one or more embodiments, the information can also be used as part of the interview process, such as delivering feedback (e.g., to an interviewer) to candidate's responses during interviews. Other embodiments are described in the subject disclosure.

One or more aspects of the subject disclosure is a method including determining, by a processing system including a processor, a group of known desired attributes associated with an employment position; and selecting, by the processing system, a subset of employees from among a group of employees according to performance data of the group of employees, wherein the group of employees is associated with the employment position. The method includes adjusting, by the processing system, the subset of employees by adding or removing employees according to the group of known desired attributes resulting in an adjusted subset of employees; and obtaining, by the processing system, employee information for the adjusted subset of employees. The method includes analyzing, by the processing system, the employee information to identify a correlation; and identifying, by the processing system, an unknown desired attribute according to the correlation. The method includes selecting, by the processing system, a second subset of employees from among the adjusted subset of employees according to second performance data; and identifying, by the processing system, a subset of the employee information for the second subset of employees. The method includes analyzing, by the processing system, the subset of the employee information to identify a second correlation; and weighting, by the processing system, the group of known desired attributes and the unknown desired attribute according to the second correlation resulting in weighted desired attributes. The method includes obtaining, by the processing system, candidate information for a group of candidates; selecting, by the processing system, a subset of candidates from among the group of candidates according to a comparison of the weighted desired attributes and the candidate information; and presenting, by the processing system, an identification of the subset of candidates.

One or more aspects of the subject disclosure include a device having a processing system including a processor; and a memory that stores executable instructions that, when executed by the processing system, facilitate performance of operations. The processing system can select a subset of employees from among a group of employees according to performance data of the group of employees, where the group of employees is associated with an employment position, and where a group of known desired attributes is associated with the employment position. The processing system can analyze employee information for the subset of employees to identify a correlation and can identify an unknown desired attribute according to the correlation. The processing system can obtain candidate information for a group of candidates; and can select a subset of candidates from among the group of candidates according to a comparison of the group of known desired attributes, the unknown desired attribute and the candidate information, where the subset of candidates includes first and second target candidates. The processing system can analyze a response provided by the first target candidate during a first interview; and can provide, to a communication device of a candidate interviewer that is performing a second interview of the second target candidate, feedback associated with the response according to the analyzing of the response, where the feedback is presented at the communication device of the candidate interviewer during the second interview.

One or more aspects of the subject disclosure include a machine-readable storage medium, comprising executable instructions that, when executed by a processing system including a processor, facilitate performance of operations, including selecting a subset of employees from among a group of employees according to performance data of the group of employees, where the group of employees is associated with an employment position, and where a group of known desired attributes is associated with the employment position. The operations can include analyzing employee information for the subset of employees to identify a correlation; and identifying an unknown desired attribute according to the correlation. The operations can include obtaining candidate information for a group of candidates; and selecting a subset of candidates from among the group of candidates according to a comparison of the group of known desired attributes, the unknown desired attribute and the candidate information. The operations can include presenting an identification of the subset of candidates; and monitoring the group of employees to identify particular employees that have a particular known desired attribute of the group of known desired attributes. The operations can include determining particular performance information of the particular employees; and determining an invalidation of the particular known desired attribute according to the particular performance information indicating that employment performance of a number of the particular employees does not satisfy a performance threshold and that the number of the particular employees satisfies an invalidity threshold. The operations can include removing the particular known desired attribute from the group of known desired attributes associated with the employment position responsive to the invalidation.

FIG. 1 depicts an illustrative embodiment of system 100 that facilitates employment-related decisions including hiring, promotions, and so forth. System 100 can include a server 110 that can perform various functions including collecting data, analyzing the data, and identifying target candidates for employment positions.

In one embodiment, server 110 can receive a request for candidates for an employment position. The server 110 can determine a group of known desired attributes associated with the employment position. As an example, the server 110 can maintain or otherwise access a list of desired attributes that are indexed to various employment positions. In another embodiment, the server 110 can maintain or otherwise access a list of undesired attributes that are indexed to various employment positions. As will be explained herein, the list of desired and/or undesired attributes can be dynamically maintained based on monitoring of employees and the performance of those employees. The list of desired and/or undesired attributes can be generated in various ways, including based on user input (e.g., from a manager associated with the employment position), analysis of employment information of successful employees, industry studies, and so forth.

The attributes can be various types such as past work experience, educational background, skills, abilities, spoken languages, and so forth. The attributes can also be based on performance metrics, such as promotions within a certain time period, salary increases, number of positive performance reviews, length of retention of the employee, and so forth. The desired attributes can also be non-employment related attributes such as hobbies, interests, participation in particular non-employment events, memberships in particular non-employment groups, and so forth.

In one embodiment, server 110 can select a subset of employees 120 from among a group of employees according to performance data of the group of employees, where the group of employees is associated with the employment position. For instance, the subset of employees 120 can represent preferred or ideal employees based on their performance data. In another embodiment, the subset of employees 120 can be further adjusted by adding or removing employees therefrom based on various factors, such as according to the group of known desired attributes. For example, a particular employee may be considered a high performer but may lack any of the known desired attributes (e.g., according to an analysis of the particular employee's resume, performance data, non-employment event data, and so forth). This particular employee may be removed from the subset of employees 120 to avoid a statistical anomaly. As another example, a particular employee may be considered a high performer and has one or more of the known desired attributes but is not associated with the employment position. This particular employee may be added to the subset of employees 120.

In one embodiment, certain employees that are considered to be high or sufficient performers may be removed from the subset of employees 120 because they are not associated with a threshold number of the known desired attributes. In another embodiment, the subset of employees 120 can be further adjusted by removing employees therefrom based on known undesired attributes. For example, a particular employee can be determined to be a high or satisfactory performer based on performance data and/or known desired attributes but one or more known undesired attributes can be identified based on analyzing the particular employee's resume, performance data, non-employment event data, and so forth. The particular employee may then be removed from the subset of employees 120 based on an analysis of the performance data and known desired attributes as compared to the one or more known undesired attributes.

Once the subset of employees 120 is determined, then the server 110 can obtain or otherwise access employee information 125 for the subset of employees. As explained above, employee information may be data that is associated with the employment of the subset of employees 120 and/or can be other information that is not employment related, such as spoken languages, hobbies, interests, participation in particular non-employment events, memberships in particular non-employment groups, and so forth. The server 110 can analyze the employee information 125 for the subset of employees 120 to identify a correlation. The identified correlation can be used for identifying an unknown desired attribute that is then associated with the employment position. For example, a correlation may be discovered that a high number of the top performing language translators also play a musical instrument. As another example, a correlation may be discovered that a high number of the top performing computer programmers also took particular classes in college. In one or more embodiments, the unknown desired attribute can be unrelated to responsibilities of the employment position, such as employees that play sports and an employment position as an engineer.

In one or more embodiments, weighting for known desired attributes and/or unknown desired attributes can be determined by the server 110. For example, one or more preferred employees can be selected from among the subset of employees 120 such as based on more preferable performance data as compared to a remainder of employees of the subset of employees 120. The server can then analyze the performance data for the preferred employees to determine a correlation and can utilize that correlation to determine which of the known and/or unknown desired attributes should be weighted more heavily during a comparison with candidate information as will be described herein. As an example, the subset of employees 120 may have known desired attributes of: a degree in electrical engineering, a minor concentration in power management or a minor concentration in network infrastructure, membership in the IEEE, as well as unknown desired attributes of playing a musical instrument and proficiency in multiple foreign languages. The server 110 can determine that the preferred employees with the highest performance rating (among the selected subset of employees 120) each have a minor concentration in network infrastructure and each play a musical instrument. The server 110 can determine that the desired attributes of a minor concentration in network infrastructure and playing a musical instrument can be weighted heavier than the remaining desired attributes.

Other techniques for weighting the known and/or unknown desired attributes can also be implemented based on various factors, such as monitoring performance of employees that were hired or promoted and that currently maintained, subsequently developed or subsequently lost a particular desired attribute. For instance, an unknown desired attribute of membership in a particular society may have its weighting reduced if it is later determined that employees, who no longer are a member of the particular society, show no or little reduction in performance.

The server 110 can obtain candidate information 135 for a group of candidates 130. The obtaining of the candidate information 135 can be by various techniques, such as resumes or other information provided directly from a candidate (e.g., mailed or emailed/uploaded to server 110 via a network 115); and/or resumes or other information provided from a third party (e.g., employment agency, university career services office, and so forth) facilitating the employment of a candidate. In one embodiment, the obtaining of the candidate information 135 can be a proactive technique where some or all of the known and/or unknown desired attributes are utilized for generating employment and/or internal advancement listings.

The server 110 can select a subset of candidates from among the group of candidates 130 according to a comparison of the candidate information 135 with (or correlated to) the known and/or unknown desired attributes (which may or may not be weighted). In one or more embodiments, the server 110 can present or otherwise provide an identification of the selected subset of candidates.

In one or more embodiments, the server 110 can access resumes of the group of candidates 130; can access publicly available information of the group of candidates; and can analyze the resumes and the publicly available information to identify correlated candidate information and de-correlated candidate information. In one embodiment, the selecting of the subset of candidates from among the group of candidates 130 can be according to a comparison of the weighted desired attributes, the correlated candidate information, and the de-correlated candidate information. In one or more embodiments, the server 110 can select another subset of employees 160 from among the group of employees (e.g., employees associated with the employment position) according to undesired performance data; and can obtain other employee information 165 for the other subset of employees 160. The server 110 can then analyze the other employee information 165 to identify a correlation; and can identify one or more undesired characteristics according to the correlation. The undesired characteristics can then be utilized by server 110 for selecting of the subset of candidates from among the group of candidates 130 (e.g., filtering out particular candidates). In one or more embodiments, the undesired characteristics can be weighted, such as based on identifying the lowest performers and identifying which undesired characteristics are correlated with the lowest performers.

In one or more embodiments, the performance data can include promotions, time to obtain the promotions, positive performance reviews, salary adjustments, awards, and so forth. In another embodiment, the undesired performance data can include voluntary and involuntary terminations, a time period associated with the voluntary and involuntary terminations, salary change data, negative performance reviews, and so forth.

In one or more embodiments, the server 110 can analyze a response provided by a target candidate (of the selected subset of candidates) during an interview. The analyzing of the response can be based on various criteria, including the unknown desired attribute(s), the known desired attribute(s), the undesired characteristics, responses provided by other candidates of the selected subset of candidates, and so forth. The server 110 can then provide, to a communication device 170 of a candidate interviewer, feedback 175 associated with the response according to the analyzing of the response. In one embodiment, the feedback can be presented at the communication device of the candidate interviewer during the interview. In another embodiment, the response feedback can be performed in real-time so that simultaneous interviews can have the benefit of comparing candidate responses and generating further discussion with the candidates based on responses of other candidates.

In another embodiment, the server 110 can analyze a response provided by a first target candidate (of the selected subset of candidates) during a first interview, wherein the analyzing of the response is according to the unknown desired attribute and/or the group of known desired attributes. The server 110 can then provide, to a communication device of a candidate interviewer that is performing a second interview of a second target candidate (of the subset of candidates), feedback 175 associated with the response according to the analyzing of the response. In one embodiment, the feedback 175 can be presented at the communication device of the candidate interviewer during the second interview. In another embodiment, the first and second interviews can occur in an overlapping time period and feedback 175 associated with multiple candidates can be shared with multiple interviewers in real-time.

In one or more embodiments, the server 110 can monitor and/or collect non-employment activity data for the group of employees. For example, the non-employment activity data can be based on participation by the group of employees in events that are not associated with employment. In one embodiment, the selecting of the subset of employees 120 from among the group of employees is based in part on the non-employment activity data.

In one or more embodiments, the server 110 can obtain non-employee information for a group of non-employees that are selected based on the employment position. For example, the non-employees can be former employees, candidates that rejected a previous offer for the position, other individuals that are employed in a similar position at a different employer, and so forth. In one or more embodiments, the identification of the unknown desired attribute can be based in part on the non-employee information, such as a correlation for high performers being identified by analyzing the employee information in combination with the non-employee information.

In one or more embodiments, the server 110 can perform an invalidation with respect to desired attributes. For example, the server 110 can monitor the group of employees to identify particular employees that have a particular known desired attribute of the group of known desired attributes; and can determine particular performance information of the particular employees. The server 110 can then determine an invalidation of the particular known desired attribute according to the particular performance information indicating that employment performance of a number of the particular employees does not satisfy a performance threshold and/or that the number of the particular employees satisfies an invalidity threshold. In one embodiment, the server 110 can then remove the particular known desired attribute from the group of known desired attributes associated with the employment position responsive to the invalidation.

In one or more embodiments, the server 110 can perform a validation with respect to desired attributes. For example, the server 110 can monitor the group of employees to identify a particular employee that no longer has a particular known desired attribute of the group of known desired attributes; and can determine particular performance information of the particular employee. The server 110 can then determine a validation of the particular known desired attribute according to the particular performance information indicating that employment performance of the particular employee does not satisfy a performance threshold.

In another example of determining attribute validity, the server 110 can monitor the group of employees to identify a particular employee that develops a previously determined unknown desired attribute; and can determine particular performance information of the particular employee. The server 110 can then determine a validation of the unknown desired attribute according to the particular performance information of the particular employee. The validation can include adding the unknown desired attribute to the group of known desired attributes associated with the employment position responsive to the validation.

Figure 2:
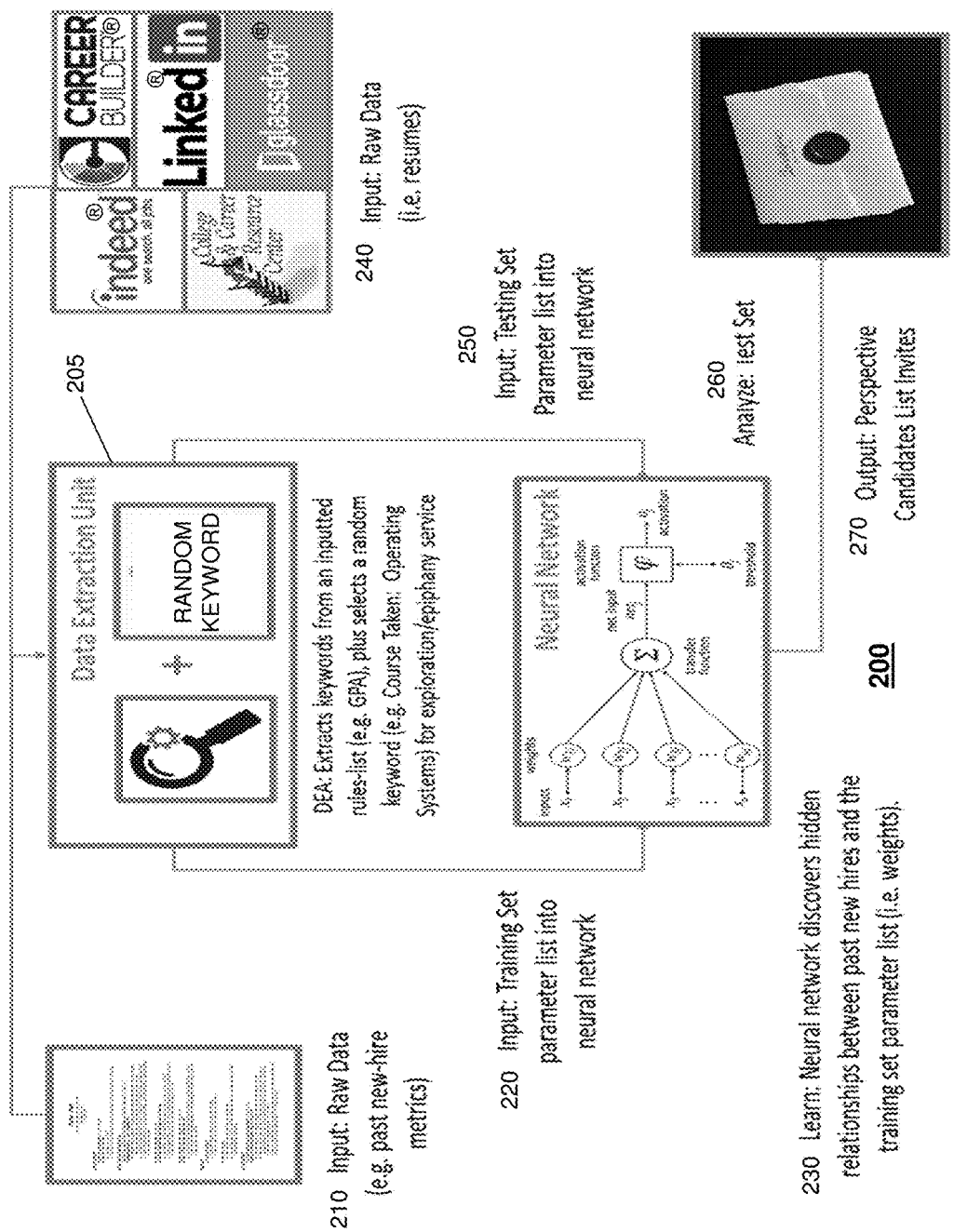
FIG. 2 depicts an illustrative embodiment of data flow that can be used with the system of FIG. 1.

FIG. 2 depicts an illustrative embodiment of a data flow 200 that can be utilized with system 100 of FIG. 1. In one embodiment, data flow 200 enables not waiting for candidates to apply to for a position. In one embodiment, data flow 200 does not use a one-size-fits-all keyword-based resume filter. In one embodiment, data flow 200 can proactively screen candidates from any identified talent pool. In one embodiment, data flow 200 can be completely automated. In one embodiment, data flow 200 can be a self-learning system that discovers unique relationships between metrics based off your existing workforce that builds a profile that predicts your perfect candidate. In one embodiment, data flow 200 can explore new skills, traits, or qualities which factor into a preferred candidate profile.

In one embodiment at 210, data flow 200 can collect resumes that a current workforce applied, and sort them by role/position. Other information can also be collected, including performance reviews, salary information, promotion information, project achievements, awards, and so forth. In one embodiment, portions of data flow 200 can be run in parallel, such as to output all profiles after a single pass. In one embodiment, resumes from candidates that were not offered positions can also be input. In another embodiment, data can be anonymized, and appropriate disclaimers can be provided upon original resume submissions. In another embodiment, the collected information can be from individuals that are not employees, such as employees of other companies.

In one embodiment at 220, data flow 200 allows for inputting a parameter list. For example, the parameter list can be a (key, value) set that maps important employment metrics with an ideal value or range of values. Examples include: (GPA, 3.5+), (Years of Experience, 3), and (Java Programming, TRUE).

In one embodiment, data flow 200 can be utilized in conjunction with a Data Extraction Unit (DEU) 205 (e.g., resident on the server 110 or executed in a distributed processing environment). In one embodiment, the DEU 205 can utilize traditional parameters and/or can discover hidden or otherwise unknown at 230. For example, the DEU 205 can be responsible for extracting the values for each key on the important parameter list from the model data input. In another embodiment, the DEU 205 can utilize an "epiphany service." For example, a subsystem of the DEU 205 can execute the epiphany service which randomly selects an additional (key, value) pair to add to the perfect candidate model schema. In this embodiment, the model may not be hindered by preconceived concepts or bias, but can also benefit from past experience and successes. In one embodiment, each model can describes a type of position to be filled. The Model can be saved to the profile archive for later use in the seek phase.

In one embodiment, the DEU 205 utilizes a training set. For example, the output from the DEU 205 can be a spreadsheet where each row represents an individual's resume, each column represents an employee characteristic (e.g., the key in the (key, value) pair), and/or each cell represents a particular value associated with that characteristic (e.g., the value in the (key, value) pair. For instance, the final column on the spreadsheet can have the name "Result." The value associated with the key can be a TRUE/FALSE indicating whether or not the candidate received an offer of employment. In one embodiment, the training set is not necessarily physically outputted but can instead be saved for later use in an employ phase.

In one embodiment at 240, talent pools can be utilized. For instance, a list of talent pools (e.g., Indeed®, Glassdoor®, Linkedin®, Career Builder®) can be fed into the system. For example, a Service Level Agreement or opt-in mechanism can be utilized for some of the talent pools (e.g., on-line career websites or college career centers). In one embodiment, data flow 200 can also utilize individual candidate submissions. Any number of candidates can be considered, including thousands if not tens of thousands of candidates to be considered per position.

In one embodiment, the DEU 205 can perform data extraction. For example, the testing set can be built from resumes or other candidate data collected from the various talent pools which are analyzed for important parameters and (key, value) pairs extracted. In one embodiment, a testing set can be utilized. The output can be a spreadsheet that has a similar structure as the training set. In one embodiment at 250 and 260, the DEU 205 can utilize an Artificial Neural Network. For example, a preferred or ideal profile can be built. For instance, the training data can be fed into the artificial neural network. In one embodiment at 230, the neural network enables relationships and patterns to be discovered between the list of parameters and the result. The neural network can generate a set of weights for each parameter which represents how much of a contribution that particular parameter's value contributes to the predictive model. The neural network can generate a predictive model based on the parameters and their values which can provide a rating for each test case entered into the data flow 200.

In one embodiment, the rating can represent the percent likelihood of a positive result. As an example, a threshold can be established for acceptable positives. For instance, 80-95% likelihood can be a target. After the neural network builds the ideal candidate profile, the testing set can be fed into the data flow 200. AT 270, the output can be a list of target candidates, along with a percent likelihood that they would ultimately be offered an employment position.

In one embodiment, interviews can be scheduled. For example, once the candidate list is finalized the data flow 200 can be configured to automatically schedule interviews. Tracking can be performed of who interviewed the perspective candidate, for how long, and over what medium. In one embodiment, after the round of hiring has been completed, the testing set resumes and their final results can be fed back into the data flow 200 to refine the model. For example, parameters can be pruned, meaning that if the weight of a particular parameter (e.g. Java Programming) was below a certain threshold (e.g. 20%) then the neural network can remove it from the model for that role.

Data flow 200 enables assessing resumes and other employment-related information at orders of magnitude faster than that of a human employee. This is accomplished through automating several key steps in the employee staffing supply chain. Data flow 200 enables employers to process more resumes per job opening than other techniques. This is due to the fact that system 100 knows what it's looking for and can actively reach out to talent pools in order to find what it wants. Data flow 200 does not rely on what one thinks one needs to fill a certain position. Instead, data flow 200 leverages the power of data analytics to discover the hidden relationships between non-intuitive characteristics that are not self-evident to unlock the unique formula to solve your needs.

Data flow 200 enables managing a candidate list by tracking the source (e.g., recording the talent pool associated with each candidate), scheduling the interview, and/or tracking the ultimate disposition on each candidate (e.g., hire/no-hire/offer refused). This data can be used in several ways. For example, candidate profiles can be created around those who refused offers, and then insights learned from these profiles can be used to address any issues uncovered by such insights.

Figure 3:
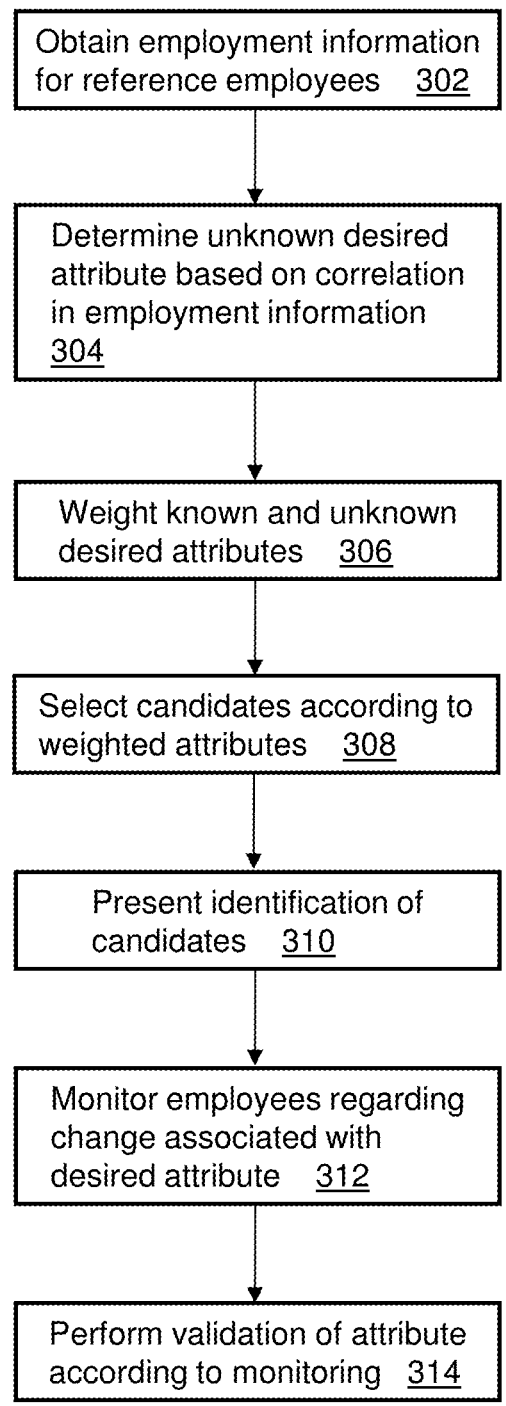
FIG. 3 depicts an illustrative embodiment of a method used in portions of the system described in FIG. 1.

FIG. 3 depicts an illustrative embodiment of a method used in system 100 for managing employment decisions. Method 300 enables management of employment-related decisions including hiring and promotions.

At 302, employment information can be obtained for reference employees where the reference employees are considered to be target performers (e.g., have high performance reviews, rapidly promoted, and so forth). For example, a subset of employees can be selected from among a group of employees according to performance data of the group of employees, where the group of employees is associated with an employment position. In one embodiment, a group of known desired attributes can be associated with the employment position.

At 304, one or more unknown desired attributes can be discovered or otherwise detected. For example, the employee information for the subset of employees can be analyzed to identify a correlation and an unknown desired attribute can be determined according to the correlation. For instance, it may be discovered that 70% of the selected subset of employees (e.g., high performers) that are associated with a position as a computer programmer, have a common particular interest that is not related to computer programming, such as boat building.

In one embodiment at 306, the known and/or unknown desired attributes can be weighted. For example, known desired attributes that have been validated by monitoring performance of past employees having the known desired attribute may receive a higher weighting than known desired attributes that have not been validated and/or may receive a higher weighting than unknown desired attributes.

At 308, a subset of candidates can be selected from a group of candidates. For example, candidate information can be obtained for a group of candidates. A subset of candidates from among the group of candidates can be selected according to a comparison of the group of known desired attributes, the unknown desired attribute and the candidate information, which may or may not be a weighted analysis. At 310, the selected subset of candidates can be identified, such as presenting a list to an administrator, automatically scheduling interviews, and so forth.

Validation of the desired attributes can be performed by method 300. At 312, employees possessing one or more desired and/or undesired attributes can be monitored for changes in performance and/or changes in the desired attribute. At 314, a validation can be determined according to the monitoring. For example, a deterioration in performance of employees having a particular attribute can cause the attribute to be removed from a known desired attribute list. As another example, a continued high level of performance of an employee having a detected unknown desired attribute can cause the detected unknown desired attribute to be added to a list of known desired attributes. The validation process can be performed based on thresholds, such as threshold number of employees that have undergone the detected change. In another embodiment, the validation process can be performed across multiple employment positions that have common desired attributes.

In one embodiment, the selected subset of candidates includes first and second target candidates. The method 300 can include analyzing a response provided by the first target candidate during a first interview; and providing, to a communication device of a candidate interviewer that is performing a second interview of the second target candidate, feedback associated with the response according to the analyzing of the response. In another embodiment, the feedback can be presented at the communication device of the candidate interviewer during the second interview. In this example, method 300 is providing real-time candidate feedback across multiple candidates and across multiple interviewers which would otherwise not be available absent the use of system 100 and data flow 200.

In one embodiment, the first and second interviews can occur in an overlapping time period. In one embodiment, the analyzing of the response is according to the unknown desired attribute and the group of known desired attributes. In one embodiment, method 300 can include selecting a second subset of employees from among the subset of employees according to second performance data; identifying a subset of the employee information for the second subset of employees; analyzing the subset of employee information to identify a second correlation; and weighting the group of known desired attributes and the unknown desired attribute according to the second correlation resulting in weighted desired attributes, where the selecting of the subset of candidates from among the group of candidates is according to the candidate information and the weighted desired attributes.

In one embodiment, method 300 includes monitoring and collecting non-employment activity data for the group of employees, where the non-employment activity data is based on participation by the group of employees in events that are not associated with employment, and where the selecting of the subset of employees from among the group of employees is based in part on the non-employment activity data.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
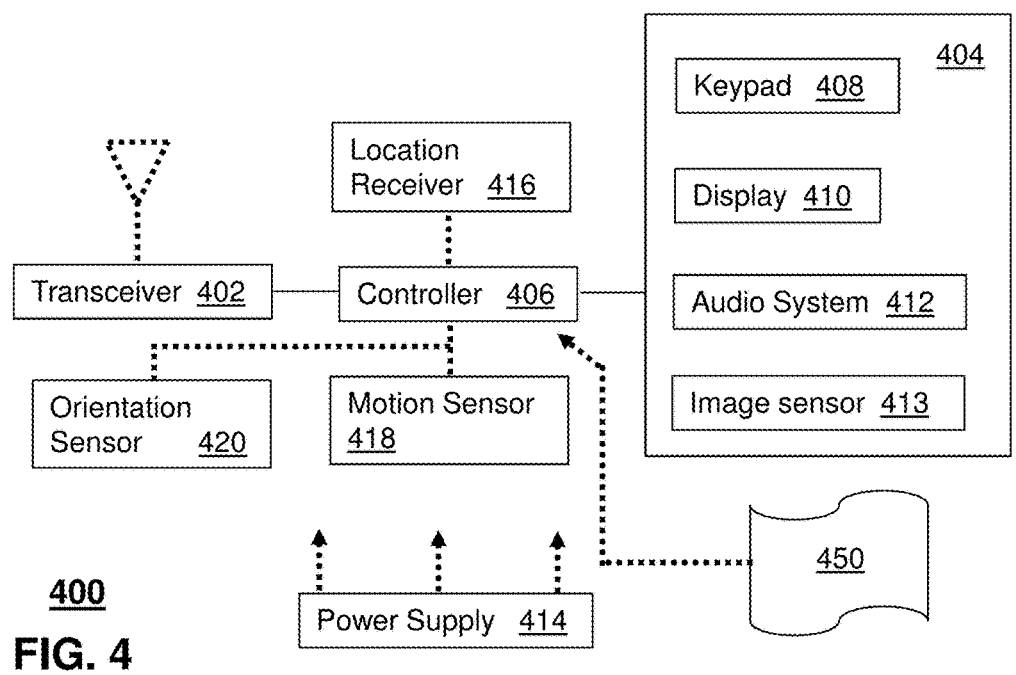
FIG. 4 depicts an illustrative embodiment of a communication device that can be used with the system of FIG. 1.

FIG. 4 depicts an illustrative embodiment of a communication device 400. Communication device 400 can serve in whole or in part as an illustrative embodiment of the devices depicted in FIGS. 1 and 2, and can be configured to perform all or portions of method 300 of FIG. 3. For example, the device 400 can: select a subset of employees from among a group of employees according to performance data of the group of employees, where the group of employees is associated with an employment position, and where a group of known desired attributes is associated with the employment position; analyze employee information for the subset of employees to identify a correlation; identify an unknown desired attribute according to the correlation; obtain candidate information for a group of candidates; select a subset of candidates from among the group of candidates according to a comparison of the group of known desired attributes, the unknown desired attribute and the candidate information; present an identification of the subset of candidates; monitor the group of employees to identify particular employees that have a particular known desired attribute of the group of known desired attributes; determine particular performance information of the particular employees; determine an invalidation of the particular known desired attribute according to the particular performance information indicating that employment performance of a number of the particular employees does not satisfy a performance threshold and that the number of the particular employees satisfies an invalidity threshold; and/or remove the particular known desired attribute from the group of known desired attributes associated with the employment position responsive to the invalidation.

In one or more embodiments, device 400 can: select a second subset of employees from among the subset of employees according to second performance data; identify a subset of the employee information for the second subset of employees; analyze the subset of employee information to identify a second correlation; and weight the group of known desired attributes and the unknown desired attribute according to the second correlation resulting in weighted desired attributes, where the selecting of the subset of candidates from among the group of candidates is according to the candidate information and the weighted desired attributes. In one or more embodiments, subset of candidates can include first and second target candidates, and the device 400 can analyze a response provided by the first target candidate during a first interview; and providing, to a communication device of a candidate interviewer that is performing a second interview of the second target candidate, feedback associated with the response according to the analyzing of the response, where the feedback is presented at the communication device of the candidate interviewer during the second interview.

In one or more embodiments, device 400 can: monitor the group of employees to identify a particular employee that develops the unknown desired attribute; determine particular performance information of the particular employee; determine a validation of the unknown desired attribute according to the particular performance information of the particular employee; and add the unknown desired attribute to the group of known desired attributes associated with the employment position responsive to the validation.

Communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of server 110 and DEU 205. It will be appreciated that the communication device 400 can also represent other devices that can operate in FIGS. 1 and/or 2. In addition, the controller 406 can be adapted in various embodiments to perform function 450 which includes collecting employee information, analyzing the employee information to detect unknown desired attributes, weighting the desired attributes, and/or comparing candidate information to desired attributes to identify preferred candidates.

Upon reviewing the aforementioned embodiments, it would be evident to an artisan with ordinary skill in the art that said embodiments can be modified, reduced, or enhanced without departing from the scope of the claims described below. For example, other information associated with candidates and/or employees can be obtained as part of determining unknown desired attributes and/or for identifying preferred candidates, which may or may not be public information.

In one or more embodiments, feedback information for multiple candidate responses can be presented to an interviewer. For example, a first interviewer of a first candidate can receive a response from the first candidate during a first interview. System 100 can identify the response (e.g., via voice recognition) and can analyze responses from other candidates (e.g., accessing a database for responses during past interviews and/or accessing locally stored responses for interviews that are concurrently being conducted). System 100 can then present feedback 175 (which includes information associated with the responses of the other candidates) at a communication device of the first interviewer. This allows the first interviewer to explore other questions with the first candidate that are customized for a comparison with the other candidates. System 100 can further provide feedback to other interviewers based on any responses provided by the first candidate.

In one or more embodiments, the system 100 can rate responses of the candidates (e.g., via a comparison with other candidates). The rating can be presented to interviewers so that they can further flush out responses of the candidate (e.g., where a response is rated low).

The embodiments described herein can include mechanisms for providing notice and obtaining approval of any party before accessing or otherwise utilizing any information associated with the party. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
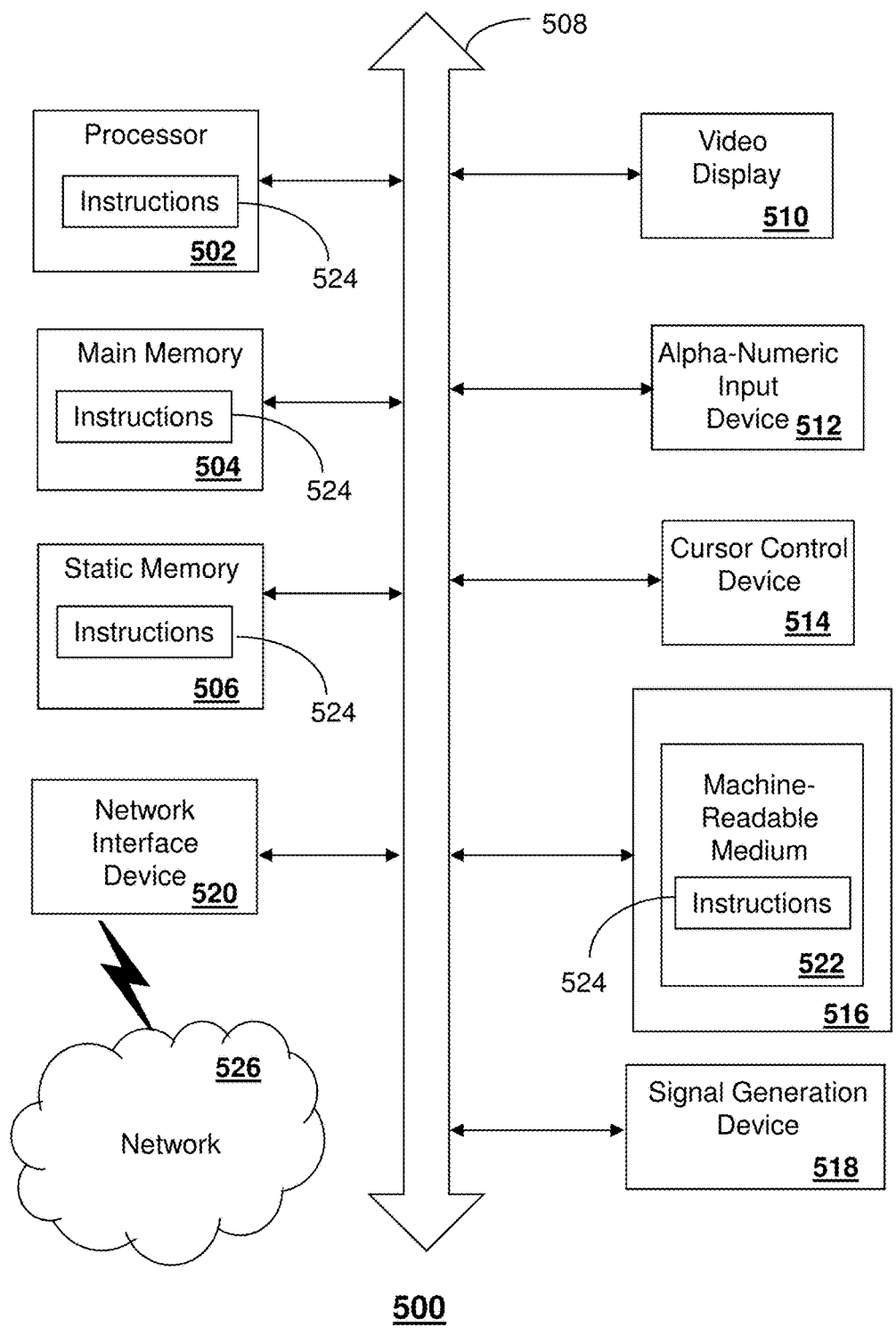
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as the server 110 or the DEU 205 for managing employment decisions as described herein. In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 500. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

selecting, by a processing system including a processor, a group of traditional, known desired attributes from a list of traditional, known desired attributes associated with an employment position;

selecting, by the processing system, a subset of employees from among a group of employees according to performance data of the group of employees, wherein the group of employees is associated with the employment position;

adjusting, by the processing system, the subset of employees by adding or removing employees according to the group of traditional, known desired attributes resulting in an adjusted subset of employees;

obtaining, by the processing system, employee information for the adjusted subset of employees;

determining, by the processing system, a group of prior candidates that rejected offers of employment;

obtaining, by the processing system, prior candidate information for the group of prior candidates;

analyzing, by the processing system, the employee information and the prior candidate information to identify a first correlation;

identifying, by the processing system, a hidden discovered desired attribute according to: the first correlation and a determination that the discovered desired attribute is not on the list of traditional, known desired attributes associated with the employment position;

providing, by the processing system, a training set to an artificial neural network, wherein the training set comprises a key-value pair randomly selected from a key value list;

selecting, by the processing system, a second subset of employees from among the adjusted subset of employees according to second performance data;

identifying, by the processing system, a subset of the employee information of the second subset of employees;

analyzing, by the processing system, a first employee characteristic and a second employee characteristic of the subset of the employee information of the second subset of employees to identify a second correlation;

obtaining, by the processing system, parameter weights from the artificial neural network, wherein the parameter weights are determined according to the training set;

weighting, by the processing system, the group of traditional, known desired attributes and the discovered desired attribute according to weighting information that includes the second correlation and the parameter weights, resulting in weighted desired attributes;

obtaining, by the processing system, candidate information for a group of candidates;

selecting, by the processing system, a subset of candidates from among the group of candidates according to a comparison of the weighted desired attributes and the candidate information; and presenting, by the processing system, an identification of the subset of candidates.

2. The method of claim 1, wherein the identifying the discovered desired attribute is further based on a determination that the discovered desired attribute is not related to the employment position;

wherein the obtaining the candidate information for the group of candidates comprises:

accessing resumes of the group of candidates;

accessing publicly available information of the group of candidates; and analyzing the resumes and the publicly available information to identify correlated candidate information amongst the resumes and the publicly available information and de-correlated candidate information amongst the resumes and the publicly available information; and wherein the selecting of the subset of candidates from among the group of candidates is according to the comparison of the weighted desired attributes, the correlated candidate information, and the de-correlated candidate information.

3. The method of claim 2, comprising:

selecting, by the processing system, a third subset of employees from among the group of employees according to undesired performance data;

obtaining, by the processing system, other employee information for the third subset of employees;

analyzing, by the processing system, the other employee information to identify an other correlation; and identifying, by the processing system, a group of undesired characteristics according to the other correlation, wherein the selecting of the subset of candidates from among the group of candidates is based in part on the group of undesired characteristics.

4. The method of claim 3, wherein the performance data includes promotions and time to obtain the promotions, and wherein the undesired performance data includes voluntary and involuntary terminations, and a time period associated with the voluntary and involuntary terminations.

5. The method of claim 1, wherein the subset of candidates includes a target candidate, and further comprising:

analyzing, by the processing system, a response provided by the target candidate during an interview, wherein the analyzing of the response is according to the discovered desired attribute and the group of traditional, known desired attributes; and providing, by the processing system to a communication device of a candidate interviewer, feedback associated with the response according to the analyzing of the response, wherein the feedback is presented at the communication device of the candidate interviewer during the interview.

6. The method of claim 1, comprising:

monitoring and collecting, by the processing system, non-employment activity data for the group of employees, wherein the non-employment activity data is based on participation by the group of employees in events that are not associated with employment, wherein the selecting of the subset of employees from among the group of employees is based in part on the non-employment activity data; and obtaining, by the processing system, non-employee information for a group of non-employees that are selected based on the employment position, wherein the first correlation is identified by analyzing the employee information in combination with the non-employee information.

7. The method of claim 1, comprising:

monitoring, by the processing system, the group of employees to identify a particular employee that develops the discovered desired attribute;

determining, by the processing system, particular performance information of the particular employee;

determining, by the processing system, a validation of the discovered desired attribute according to the particular performance information of the particular employee; and adding, by the processing system, the discovered desired attribute to the group of traditional, known desired attributes associated with the employment position responsive to the validation.

8. The method of claim 1, comprising:

monitoring, by the processing system, the group of employees to identify a particular employee that no longer has a particular known desired attribute of the group of traditional, known desired attributes;

determining, by the processing system, particular performance information of the particular employee; and determining, by the processing system, a validation of the particular known desired attribute according to the particular performance information indicating that employment performance of the particular employee does not satisfy a performance threshold.

9. The method of claim 1, comprising:

monitoring, by the processing system, the group of employees to identify particular employees that have a particular known desired attribute of the group of traditional, known desired attributes;

determining, by the processing system, particular performance information of the particular employees;

determining, by the processing system, an invalidation of the particular known desired attribute according to the particular performance information indicating that employment performance of a number of the particular employees does not satisfy a performance threshold and that the number of the particular employees satisfies an invalidity threshold; and removing, by the processing system, the particular known desired attribute from the group of traditional, known desired attributes associated with the employment position responsive to the invalidation.

10. The method of claim 1, wherein the subset of candidates includes first and second target candidates, and further comprising:

analyzing, by the processing system, a response provided by the first target candidate during a first interview, wherein the analyzing of the response is according to the discovered desired attribute and the group of traditional, known desired attributes; and providing, by the processing system to a communication device of a candidate interviewer that is performing a second interview of the second target candidate, feedback associated with the response according to the analyzing of the response, wherein the feedback is presented at the communication device of the candidate interviewer during the second interview.

11. The method of claim 10, wherein the first and second interviews occur in an overlapping time period.

12. A device comprising:
a processing system including a processor; and
a memory that stores executable instructions that, when executed by the processing system, facilitate performance of operations, the operations comprising:
selecting a group of traditional, known desired attributes from a list of traditional, known desired attributes associated with an employment position;
selecting a subset of employees from among a group of employees according to performance data of the group of employees, wherein the group of employees is associated with the employment position;
adjusting the subset of employees by adding or removing employees according to the group of traditional, known desired attributes resulting in an adjusted subset of employees;
obtaining employee information for the adjusted subset of employees;
determining a group of prior candidates that rejected offers of employment;
obtaining prior candidate information for the group of prior candidates;
analyzing the employee information and the prior candidate information to identify a first correlation;
identifying a discovered desired attribute according to:
the first correlation and a determination that the discovered desired attribute is not on the list of traditional, known desired attributes associated with the employment position;
providing a training set to an artificial neural network, wherein the training set comprises a key-value pair randomly selected from a key value list;
selecting a second subset of employees from among the adjusted subset of employees according to second performance data;
identifying a subset of the employee information of the second subset of employees;
analyzing a first employee characteristic and a second employee characteristic of the subset of the employee information of the second subset of employees to identify a second correlation;
obtaining parameter weights from the artificial neural network, wherein the parameter weights are determined according to the training set;
weighting the group of traditional, known desired attributes and the discovered desired attribute according to weighting information that includes the second correlation and the parameter weights, resulting in weighted desired attributes;
obtaining candidate information for a group of candidates;
selecting a subset of candidates from among the group of candidates according to a comparison of the weighted desired attributes and the candidate information; and
presenting an identification of the subset of candidates.

13. The device of claim 12, wherein the operations further comprise:

wherein the obtaining the candidate information for the group of candidates comprises:
accessing resumes of the group of candidates;
accessing publicly available information of the group of candidates; and
analyzing the resumes and the publicly available information to identify correlated candidate information amongst the resumes and the publicly available information and de-correlated candidate information amongst the resumes and the publicly available information,
wherein the selecting of the subset of candidates from among the group of candidates is according to the comparison of the weighted desired attributes, the correlated candidate information, and the de-correlated candidate information.

14. The device of claim 13, wherein the operations further comprise:
selecting a third subset of employees from among the group of employees according to undesired performance data;
obtaining other employee information for the third subset of employees;
analyzing the other employee information to identify an other correlation; and
identifying a group of undesired characteristics according to the other correlation,
wherein the selecting of the subset of candidates from among the group of candidates is based in part on the group of undesired characteristics.

15. The device of claim 14, wherein the performance data includes promotions and time to obtain the promotions, and wherein the undesired performance data includes voluntary and involuntary terminations, and a time period associated with the voluntary and involuntary terminations.

16. The device of claim 12, wherein the operations further comprise:
monitoring and collecting non-employment activity data for the group of employees, wherein the non-employment activity data is based on participation by the group of employees in events that are not associated with employment, wherein the selecting of the subset of employees from among the group of employees is based in part on the non-employment activity data; and
obtaining non-employee information for a group of non-employees that are selected based on the employment position, wherein the first correlation is identified by analyzing the employee information in combination with the non-employee information.

17. A non-transitory, machine-readable medium, comprising executable instructions that, when executed by a processing system including a processor, facilitate performance of operations, the operations comprising:
selecting a group of traditional, known desired attributes from a list of traditional, known desired attributes associated with an employment position;
selecting a subset of employees from among a group of employees according to performance data of the group of employees, wherein the group of employees is associated with the employment position;
adjusting the subset of employees by adding or removing employees according to the group of traditional, known desired attributes resulting in an adjusted subset of employees;
obtaining employee information for the adjusted subset of employees;

determining a group of prior candidates that rejected offers of employment;
obtaining prior candidate information for the group of prior candidates;
analyzing the employee information and the prior candidate information to identify a first correlation;
identifying a discovered desired attribute according to: the first correlation and a determination that the discovered desired attribute is not on the list of traditional, known desired attributes associated with the employment position;
providing a training set to an artificial neural network, wherein the training set comprises a key-value pair randomly selected from a key value list;
selecting a second subset of employees from among the adjusted subset of employees according to second performance data;
identifying a subset of the employee information of the second subset of employees;
analyzing a first employee characteristic and a second employee characteristic of the subset of the employee information of the second subset of employees to identify a second correlation;
obtaining parameter weights from the artificial neural network, wherein the parameter weights are determined according to the training set;
weighting the group of traditional, known desired attributes and the discovered desired attribute according to weighting information that includes the second correlation and the parameter weights, resulting in weighted desired attributes;
obtaining candidate information for a group of candidates;
selecting a subset of candidates from among the group of candidates according to a comparison of the weighted desired attributes and the candidate information; and
presenting an identification of the subset of candidates.

18. The non-transitory, machine-readable medium of claim 17, wherein the operations further comprise:

wherein the obtaining the candidate information for the group of candidates comprises:
accessing resumes of the group of candidates;
accessing publicly available information of the group of candidates; and
analyzing the resumes and the publicly available information to identify correlated candidate information amongst the resumes and the publicly available information and de-correlated candidate information amongst the resumes and the publicly available information,
wherein the selecting of the subset of candidates from among the group of candidates is according to the comparison of the weighted desired attributes, the correlated candidate information, and the de-correlated candidate information.

19. The non-transitory, machine-readable medium of claim 18, wherein the operations further comprise:
selecting a third subset of employees from among the group of employees according to undesired performance data;
obtaining other employee information for the third subset of employees;
analyzing the other employee information to identify an other correlation; and
identifying a group of undesired characteristics according to the other correlation,
wherein the selecting of the subset of candidates from among the group of candidates is based in part on the group of undesired characteristics.

20. The non-transitory, machine-readable medium of claim 19, wherein the performance data includes promotions and time to obtain the promotions, and wherein the undesired performance data includes voluntary and involuntary terminations, and a time period associated with the voluntary and involuntary terminations.

* * * * *

UNITED STATES PATENT AND TRADEMARK OFFICE
CERTIFICATE OF CORRECTION

PATENT NO. : 11,132,644 B2
APPLICATION NO. : 15/196471
DATED : September 28, 2021
INVENTOR(S) : Timothy Innes et al.

Page 1 of 1

It is certified that error appears in the above-identified patent and that said Letters Patent is hereby corrected as shown below:

In the Claims

Claim 1: Column 18, Line 45 - delete "hidden"

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*